United States Patent
Park et al.

(10) Patent No.: US 6,290,141 B1
(45) Date of Patent: Sep. 18, 2001

(54) COMMUNICATION MODULE AND INITIALIZATION METHOD FOR MULTI-AIR CONDITIONER SYSTEM

(75) Inventors: Jun Hyoung Park; Si Pung Seong, both of Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/415,921

(22) Filed: Oct. 12, 1999

(30) Foreign Application Priority Data

Feb. 26, 1999 (KR) ................................. 99/6480
Mar. 5, 1999 (KR) ................................. 99/7395

(51) Int. Cl.$^7$ ........................................ F25B 7/00
(52) U.S. Cl. ............................... 236/51; 62/175
(58) Field of Search .............. 236/51; 62/115, 62/510, 175, 126, 127, 129; 165/205, 207, 208, 209

(56) References Cited

U.S. PATENT DOCUMENTS

| | | | |
|---|---|---|---|
| 4,362,270 | * 12/1982 | Cleary et al. | 236/51 X |
| 4,682,648 | * 7/1987 | Fried | 236/51 X |
| 5,383,336 | * 1/1995 | Nishida et al. | 62/175 X |
| 5,499,510 | * 3/1996 | Yoshida et al. | 62/175 |
| 5,603,225 | * 2/1997 | Tobi et al. | 236/51 X |
| 5,630,324 | * 5/1997 | Yoshida et al. | 165/205 X |

FOREIGN PATENT DOCUMENTS 6319176  11/1993 (JP) .

* cited by examiner

*Primary Examiner*—Harry B. Tanner (57) ABSTRACT

The communication module for a multi-air conditioner system, which has a plurality of indoor units and one outdoor unit for controlling the indoor units, includes a power circuit in each of the indoor units and outdoor unit. The power circuit is connected to a non-polarized two-wire power line to supply a drive power to a corresponding one of the indoor units and outdoor unit. A transmitter/receiver circuit is also included in each of the indoor units and outdoor unit, and is connected to the power line to convert information to be transmitted into a pulse form, which carries the converted result in an alternating current voltage to transmit the information through the power line and receive information from the power line. A microcomputer included in each of the indoor units and outdoor unit controls an associated system operation according to the information from the power line received by the transmitter/receiver circuit. Further, upon supply of power to the system, the outdoor unit calls the indoor units and sequentially assigns addresses to the indoor units transmitting responses earlier than the others.

2 Claims, 8 Drawing Sheets

Bits

| 7 | 6 | 5 | 4 | 3 | 2 | 1 | 0 |
|---|---|---|---|---|---|---|---|

| Preamble(P) | 1byte |
| Start frame delimiter(SFD) | 1byte |
| Destination address(DA) | 1byte |
| Source address(SA) | 1byte |
| Length(L) | 1byte |
| Data(D) | ×byte(0 – 255) |
| Frame check sequence(FCS) | 1byte |

COMMUNICATION MODULE AND INITIALIZATION METHOD FOR MULTI-AIR CONDITIONER SYSTEM

BACKGROUND OF THE INVENTION

1. Field of the Invention

The present invention relates in general to a communication module and initialization method for a multi-air conditioner system, and more particularly to a communication module and initialization method for a multi-air conditioner system, in which one outdoor unit can control a plurality of indoor units.

2. Description of the Prior Art

An air conditioner generally comprises an evaporator, compressor, condenser and expansion valve. The evaporator is installed in an indoor unit of the air conditioner, and the compressor, condenser and expansion valve are installed in an outdoor unit of the air conditioner.

Refrigerant can be changed in state through the respective components of the air conditioner in the following manner. Namely, the refrigerant is compressed by the compressor to be changed into a high-temperature/high-pressure state. In the condenser, the high-temperature/high-pressure refrigerant exchanges heat with surrounding air to be condensed into a high-pressure liquid state. Then, the expansion valve expands the high-pressure liquid refrigerant to an evaporable state, or a low-temperature/low-pressure/low-dry state. In the evaporator, the low-temperature/low-pressure/low-dry refrigerant exchanges heat with surrounding air to be changed into a low-temperature/low-pressure vapor state, thereby lowering the temperature of room air. That is, the evaporator functions to lower the room temperature.

In a building with a large number of rooms, such as a many-storied building, there has recently been applied a multi-air conditioner system in which a plurality of indoor units are connected in common to one outdoor unit. Each of the indoor units and the outdoor unit respectively comprise their microcomputers for communicating with each other to control each other's operation. That is, the microcomputer in the outdoor unit checks operating states of the respective indoor units and determines the entire load amount in accordance with the checked results. Then, the microcomputer in the outdoor unit determines how to actuate the compressor, condenser and expansion valve in the outdoor unit, in accordance with the determined load amount. Alternatively, separate sensors may be used to sense room conditions and transmit the sensed results to the microcomputer in the outdoor unit, respectively. In this case, the microcomputer in the outdoor unit transmits control signals to the microcomputers in the indoor units in response to output signals from the separate sensors, respectively, to determine operating conditions of the indoor units.

Ultimately, an address must be assigned to each of the indoor units to allow the outdoor unit to accurately control the indoor units. The indoor units sense load amounts of the associated rooms and transmit the resultant load information to the outdoor unit, respectively, and the outdoor unit processes the load information from the respective indoor units in an integrated manner, determines how to control the respective indoor units, in accordance with the processed results, and transmits the determined results respectively to the indoor units. As a result, a communication line is required to perform the above sequential process of checking the entire load amount while exchanging information.

Figure 1:
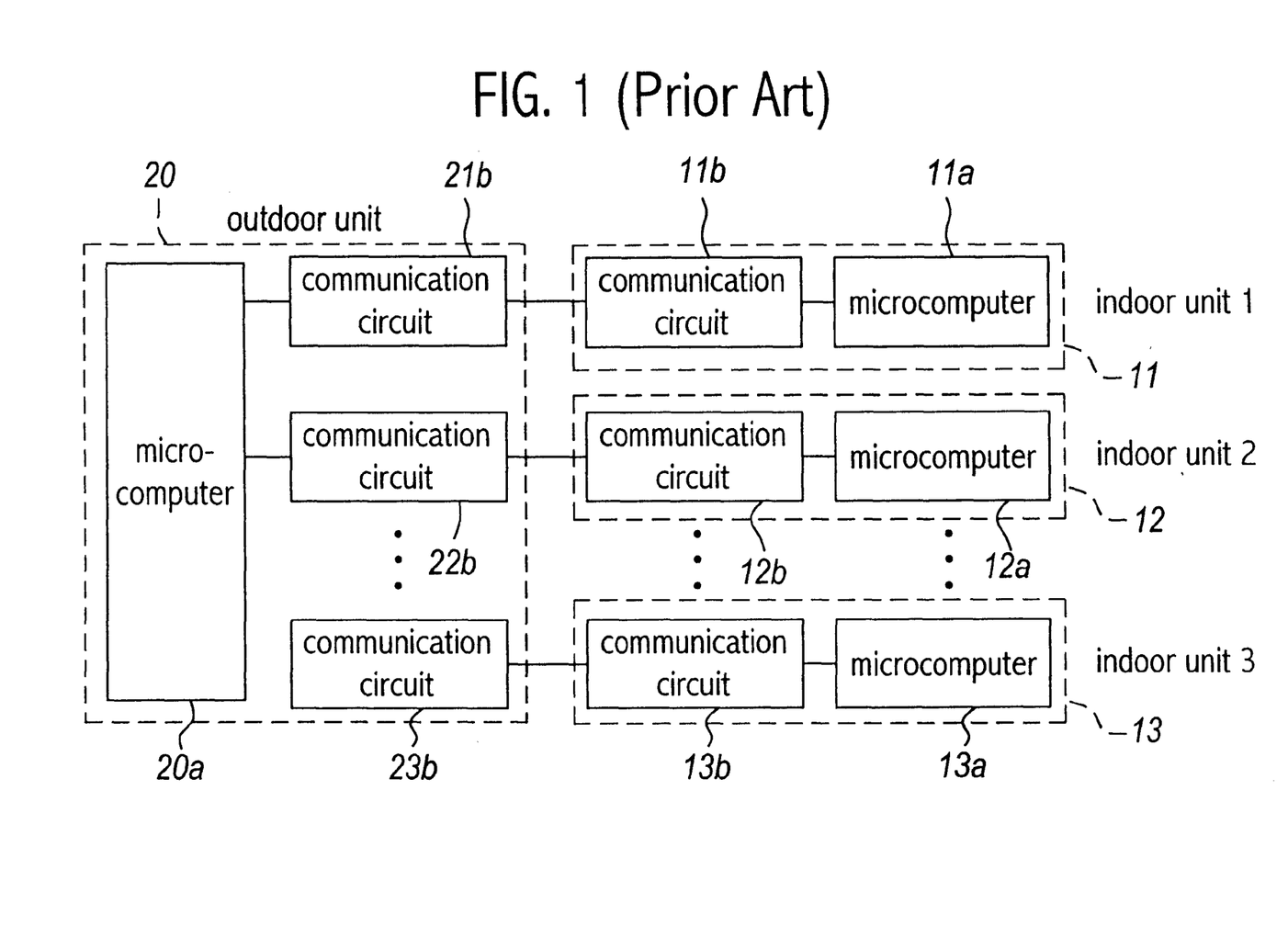
FIG. 1 is a block diagram showing the construction of a conventional multi-air conditioner system of a one-to-one communication type.

FIG. 1 is a block diagram showing the construction of a conventional multi-air conditioner system of a one-to-one communication type.

With reference to FIG. 1, the multi-air conditioner system comprises a plurality of indoor units 11, 12 and 13 and one outdoor unit 20. The indoor units 11, 12 and 13 include microcomputers 11a, 12a and 13a and first communication circuits 11b, 12b and 13b corresponding thereto, respectively. The outdoor unit 20 includes a microcomputer 20a and second communication circuits 21b, 22b and 23b corresponding respectively to the first communication circuits 12b, 12b and 13b in the indoor units 11, 12 and 13.

Figure 2A:
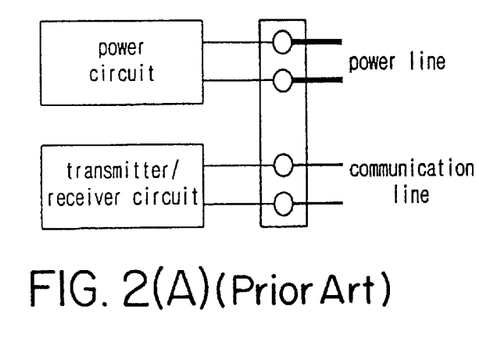
FIG. 2 is a view illustrating signal line connections of a conventional multi-wire transmitter/receiver unit.
Figure 2B:
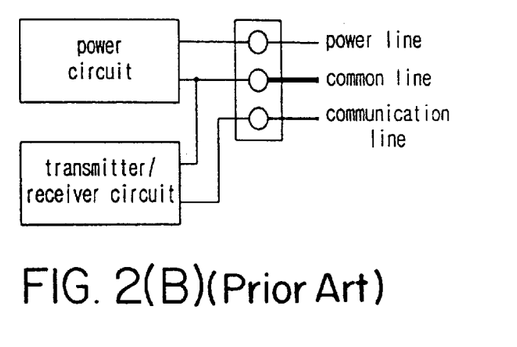

Each of the indoor units 11, 12 and 13 and the outdoor unit 20 are connected to each other in a four or three-wire manner as shown in FIG. 2. In the four-wire manner as shown in FIG. 2A, a power line and communication line each require two wires. In the three-wire manner as shown in FIG. 2B, one wire of the power line and one wire of the communication line are connected in common, resulting in the total three wires. The resultant common line is grounded.

The four-wire manner is disadvantageous in that a larger number of wires are used, resulting in an increase in material costs. For this reason, there has recently been mainly used the three-wire manner which is capable of reducing the material costs and preventing an electrical short resulting from a mis-connection between the power line and communication line.

On the other hand, in the construction of FIG. 1, the second communication circuits 21b, 22b and 23b connected to the microcomputer 20a in the outdoor unit 20 are increased in number with the indoor units 11, 12 and 13 increased in number. As a result, an increased number of communication pins must be assigned to the microcomputer 20a in the outdoor unit 20, thus making the arrangement of communication lines complex. Consequently, the installation of additional indoor units makes the communication connection complex, thereby increasing the probability of error occurrence and degrading the efficiency of communication.

In order to solve the above problems, there is required a technique in which an outdoor unit can comprise only one communication circuit for communicating with a plurality of indoor units.

Figure 3:
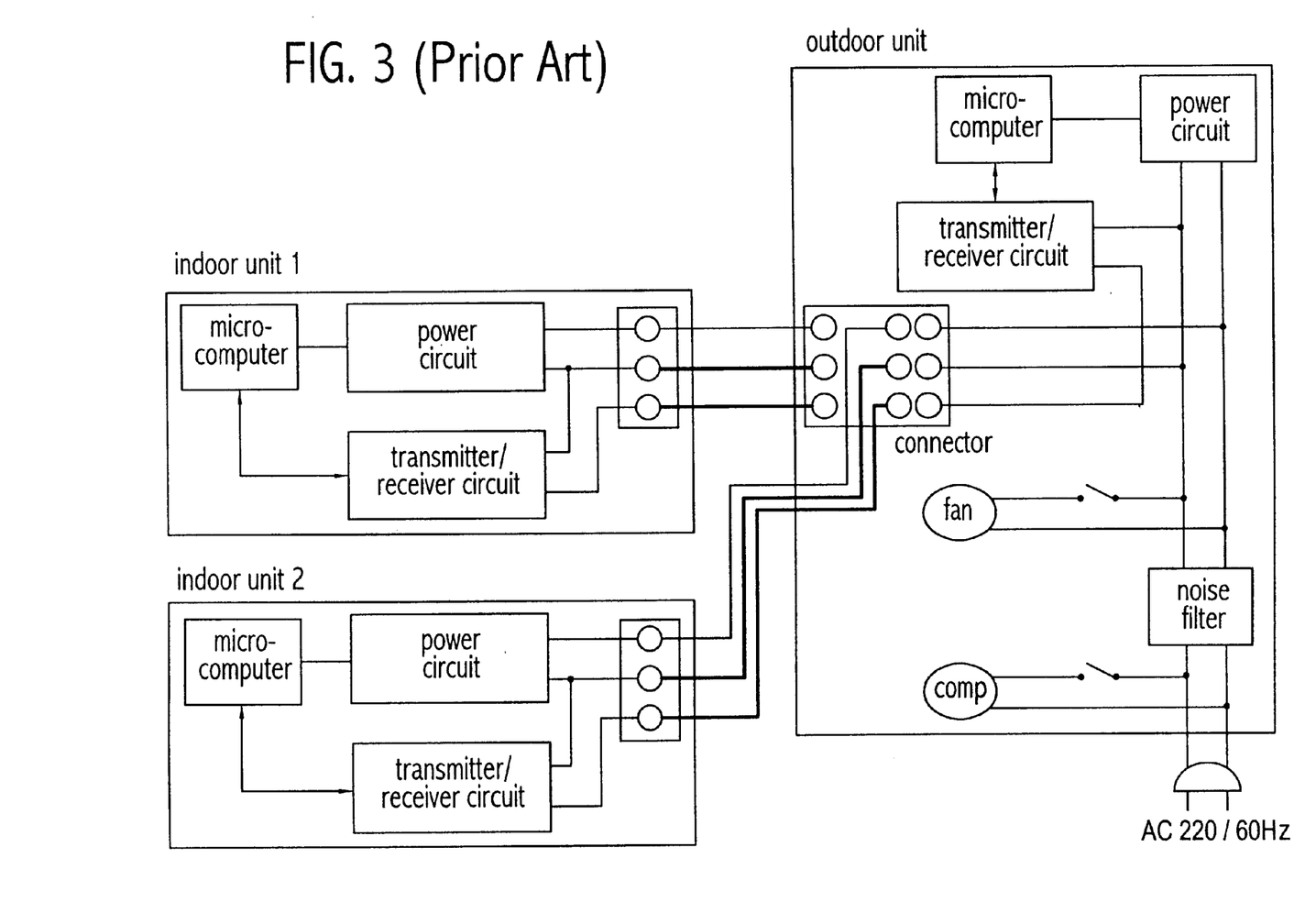
FIG. 3 is a block diagram showing the construction of another conventional multi-air conditioner system.

FIG. 3 is a block diagram showing the construction of another conventional multi-air conditioner system.

With reference to FIG. 3, an outdoor unit and indoor units each comprise a microcomputer, power circuit and transmitter/receiver circuit. Three lines extending from each of the indoor units are connected in common to a connector in the outdoor unit. The microcomputer functions to determine how to control an associated system operation. The power circuit functions to supply a drive power to a corresponding one of the outdoor unit and indoor units. The transmitter/receiver circuit functions to transmit and receive information between the outdoor unit and the indoor units.

In the above construction, the transmitter/receiver circuit in the outdoor unit receives signals from all the indoor units when it performs a communication operation. In order to identify the indoor units transmitting the signals, the outdoor un it has to address all of them.

To this end, a system installer must personally assign addresses respectively to the indoor units after finishing the mechanical installation thereof. This is inconvenient to the system installer. Further, in the case where the user changes the addresses in use, an error may occur in the communication system.

Figure 4:
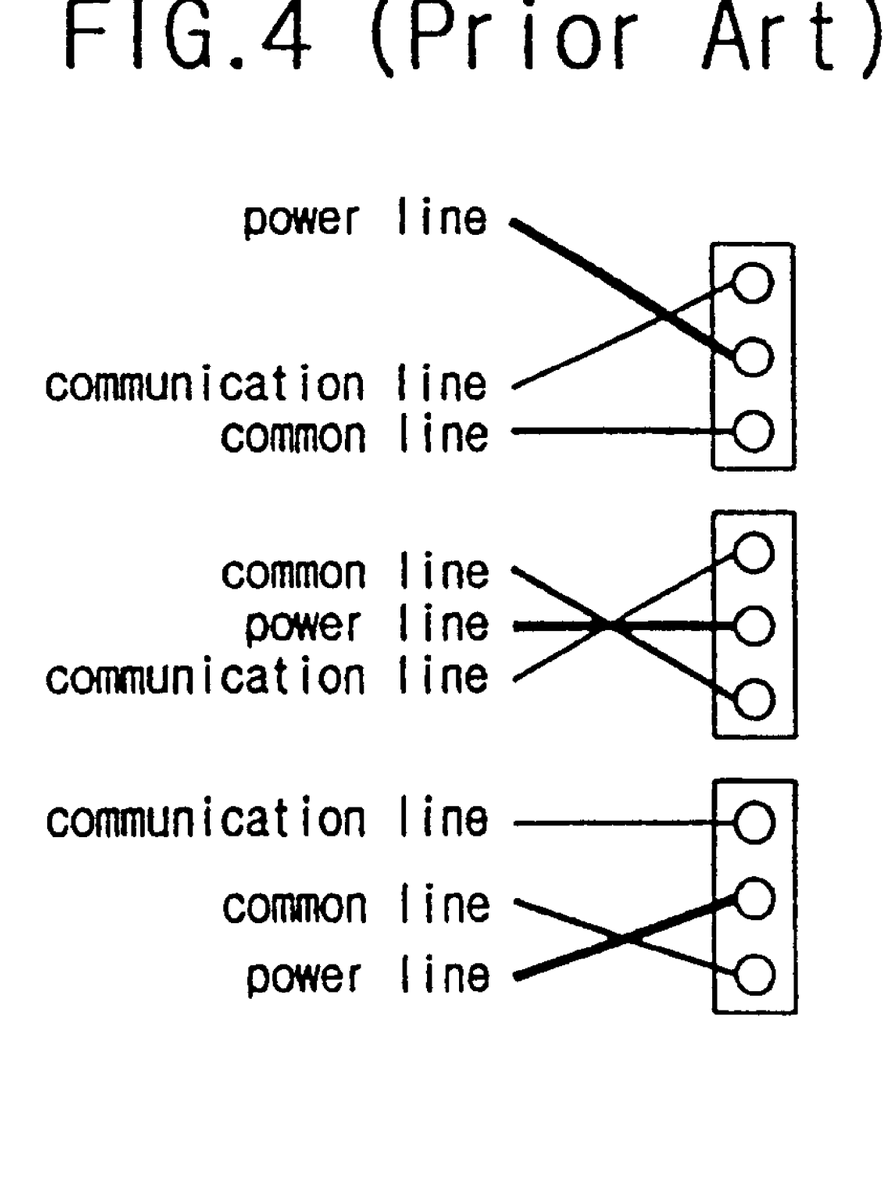
FIG. 4 is a view illustrating an example of conventional mis-wiring.

Furthermore, in the initial process of installing the air conditioner, all the lines from the indoor units are connected to the connector in the outdoor unit. At this time, the use of many lines, or the power line, common line and communication line, may cause the lines to be erroneously connected to wrong terminals of the connector, resulting in the occurrence of a mis-wiring error as shown in FIG. 4.

For the purpose of saving the user the trouble of assigning the addresses to the indoor units, Japanese Patent Laid-open Publication No. Heisei 6-319176 shows a technique capable of automatically addressing the indoor units.

In the above technique, a microcomputer in each indoor unit generates its own address in the form of a random number, and a microcomputer in an outdoor unit sequentially calls indoor units of specific addresses and designates the indoor units respectively at the specific addresses when it receives responses therefrom. However, in the case where the same address is generated from at least two indoor units, a collision occurs on communication. A typical communication systems management association/carrier detector (CSMA/CD) method is adopted in order to overcome such a problem.

However, in the case where the CSMA/CD method is applied to the random number generation, the same address is continuously generated within a set range when the random number generation is performed again due to a collision, thereby making the normal addressing operation impossible. For example, in the case where the random number generation is limited to the range of 1 to 50 and it is again performed due to a collision between two or more indoor units at an address 49, all the indoor units generate the same random number corresponding to an address 50, resulting in a failure in addressing operation.

SUMMARY OF THE INVENTION

Therefore, the present invention has been made in view of the above problems, and it is an object of the present invention to provide a communication module for a multi-air conditioner system, which is capable of effecting power supply and information exchange between an outdoor unit and indoor units using a non-polarized two-wire power line applied with an AC power, thus making the air conditioner installing work less complicated and solving a mis-wiring problem.

It is another object of the present invention to provide an initialization method for a multi-air conditioner system, in which, upon supply of power to the system, an outdoor unit calls indoor units and sequentially assigns addresses to any ones of the indoor units transmitting responses earlier than the others, so that an addressing operation can rapidly be performed with no failure.

In accordance with one aspect of the present invention, there is provided a communication module for a multi-air conditioner system which has a plurality of indoor units and one outdoor unit for controlling the indoor units, comprising a power circuit included in each of the indoor units and outdoor unit, the power circuit being connected to a non-polarized two-wire power line to supply a drive power to a corresponding one of the indoor units and outdoor unit; a transmitter/receiver circuit included in each of the indoor units and outdoor unit, the transmitter/receiver circuit being connected to the power line to convert information to be transmitted, into a pulse form, carry the converted result in an alternating current voltage to transmit the information through the power line and receive information from the power line; and a microcomputer included in each of the indoor units and outdoor unit, for controlling an associated system operation according to the information from the power line, received by the transmitter/receiver circuit.

The transmitter/receiver circuit includes a carrier signal generator for generating a pulse signal to carry the information to be transmitted, on the power line; a coupling circuit connected to the power line, for performing a signal matching operation; an amplifier for amplifying the pulse signal generated by the carrier signal generator and supplying the amplified result to the coupling circuit to establish the information transmission through the power line; and a carrier signal detector for receiving the information from the power line through the coupling circuit and demodulating the received information to detect a carrier signal therefrom.

The communication module further comprises a blocking filter connected to a main power input terminal of the system, for preventing the information transmitted and received in the system from being externally transferred.

In accordance with another aspect of the present invention, there is provided a method of performing an initialization operation of a multi-air conditioner system which has a plurality of indoor units and one outdoor unit for controlling the indoor units, comprising the first step of transmitting address N-indoor unit transmission permission information to all the indoor units upon supply of power to the system; the second step of assigning an address N to any one of the indoor units which first transmits acknowledge information in response to the address N-indoor unit transmission permission information; the third step of transmitting address N+1-indoor unit transmission permission information to all the indoor units after the second step is performed; the fourth step of assigning an address N+1 to any one of the indoor units which first transmits the acknowledge information in response to the address N+1-indoor unit transmission permission information; and the fifth step of repeating the third and fourth steps to assign addresses to all of the indoor units.

The method further comprises the sixth step of inhibiting transmission operations of ones of the indoor units assigned with their addresses, until the addresses are assigned to all of the indoor units; and the seventh step of transmitting an address assignment end signal to all the indoor units to release them from the transmission inhibition, if the addresses are assigned to all of the indoor units.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 5:
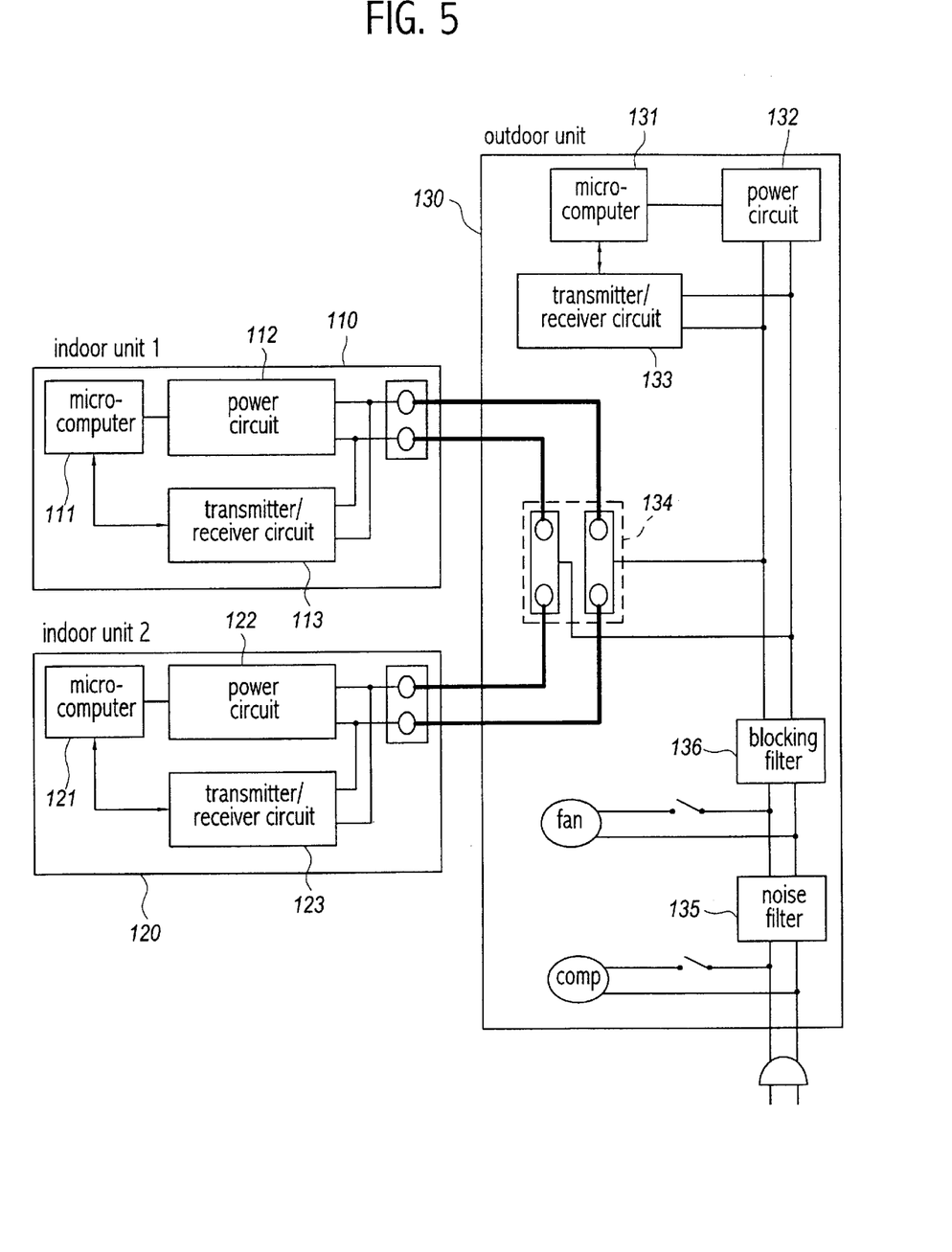
FIG. 5 is a block diagram showing the construction of a multi-air conditioner system in accordance with the present invention.

FIG. 5 is a block diagram showing the construction of a multi-air conditioner system in accordance with the present invention.

With reference to FIG. 5, the multi-air conditioner system comprises a plurality of indoor units 110 and 120 and one outdoor unit 130 which are operated depending on only one power source. The multi-air conditioner system is implemented in a two-wire power line-based transmission/reception manner where an alternating current (AC) power of 110V or 220V and 50Hz or 60Hz is used as a drive power and high-frequency information is transmitted, being placed in the drive power.

The indoor units 110 and 120 and the outdoor unit 130 comprise microcomputers 111, 121 and 131, power circuits 112, 122 and 132 and transmitter/receiver circuits 113, 123 and 133, respectively. Non-polarized two-wire power lines extending respectively from the indoor units 110 and 120 are connected in common to a connector 134 in the outdoor unit 130.

In FIG. 5, the reference numeral 135 denotes a noise filter which removes a noise component from an input power to the system, and the reference numeral 136 denotes a blocking filter which prevents information transmitted and received in the system from being transferred to the outside. According to the present invention, information is transmitted and received through a power line, which may be applied with the same electrical power as that used for air conditioners in other buildings bearing no relation to the system of the present invention. In this case, the information transmitted and received in the present system may operate an air conditioner in any other building. For this reason, the blocking filter 136 is used to prevent the transmitted and received information from being externally transferred.

Figure 6:
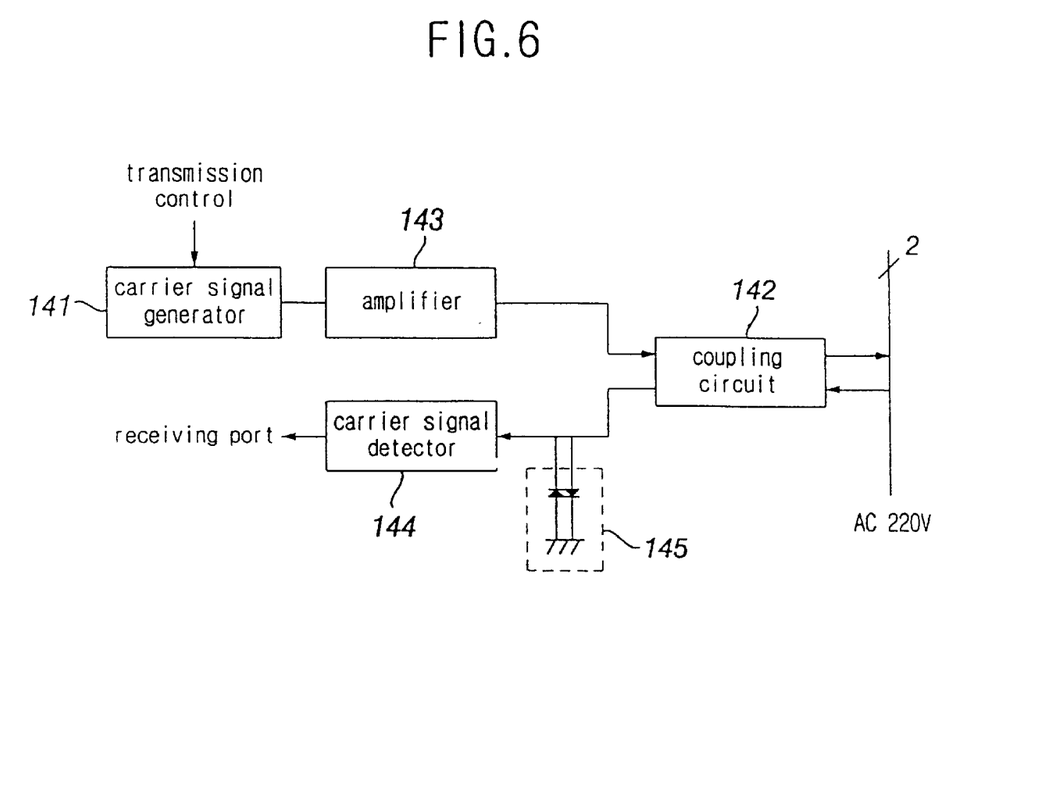
FIG. 6 is a block diagram showing the construction of a transmitter/receiver circuit in FIG. 5.

FIG. 6 is a block diagram showing the construction of each of the transmitter/receiver circuits 113, 123 and 133 in FIG. 5.

With reference to FIG. 6, the transmitter/receiver circuit includes a carrier signal generator 141 for generating a pulse signal to carry information to be transmitted, on the associated power line, a coupling circuit 142 connected to the associated power line for performing a signal matching operation, an amplifier 143 for amplifying the pulse signal generated by the carrier signal generator 141 and supplying the amplified result to the coupling circuit 142 to establish the information transmission through the associated power line, a carrier signal detector 144 for receiving information from the associated power line through the coupling circuit 142 and demodulating the received information to detect a carrier signal therefrom, and a clamping circuit 145 connected between the coupling circuit 142 and the carrier signal detector 144 for maintaining the carrier signal to be detected by the carrier signal detector 144 constantly in amplitude.

The transmission/reception operation of the abovementioned construction in accordance with the present invention will hereinafter be described in detail.

Figure 7A:
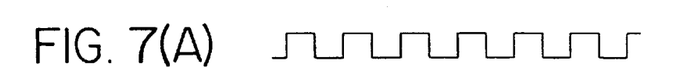
FIGS. 7A to 7E are waveform diagrams of signals in FIG. 6.

First, if each of the microcomputers 111, 121 and 131 checks the current state of the system and determines the transmission of information as a result of the checking, the carrier signal generator 141 in each of the transmitter/receiver circuits 113, 123 and 133 generates a pulse signal as shown in FIG. 7A to carry the information on the associated power line. Because the pulse signal is in the form of a square wave, it is generated in an on/off manner in response to a transmission control signal from the associated microcomputer to signify the information.

Figure 7B:
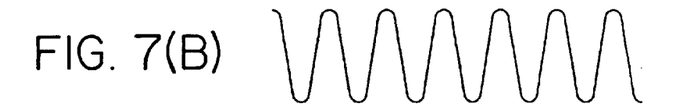
Figure 7C:
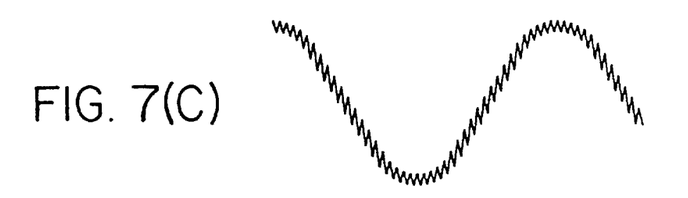

The pulse signal from the carrier signal generator 141 is amplified in an analog manner as shown in FIG. 7B by the amplifier 143 and then applied to the coupling circuit 142, which is composed of an inductor and capacitor. The coupling circuit 142 transmits the output signal from the amplifier 143 over the power line while carrying it in an AC voltage of 60Hz, as shown in FIG. 7C.

Figure 7D:
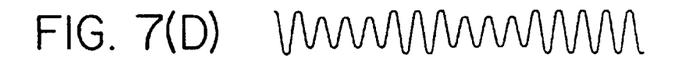
Figure 7E:
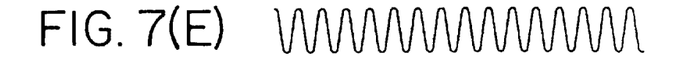

If the outdoor unit or any other indoor unit receives the signal transmitted as mentioned above, the coupling circuit 142 therein removes a 60Hz power signal from the received signal to pass only a carrier signal as shown in FIG. 7D. Because the passed carrier signal is not constant in amplitude, the clamping circuit 145 acts to maintain it constantly in amplitude, as shown in FIG. 7E. Then, the carrier signal detector 144 detects the pulse signal as shown in FIG. 7A from the output of the clamping circuit 145, so as to demodulate the received information.

Figure 8:
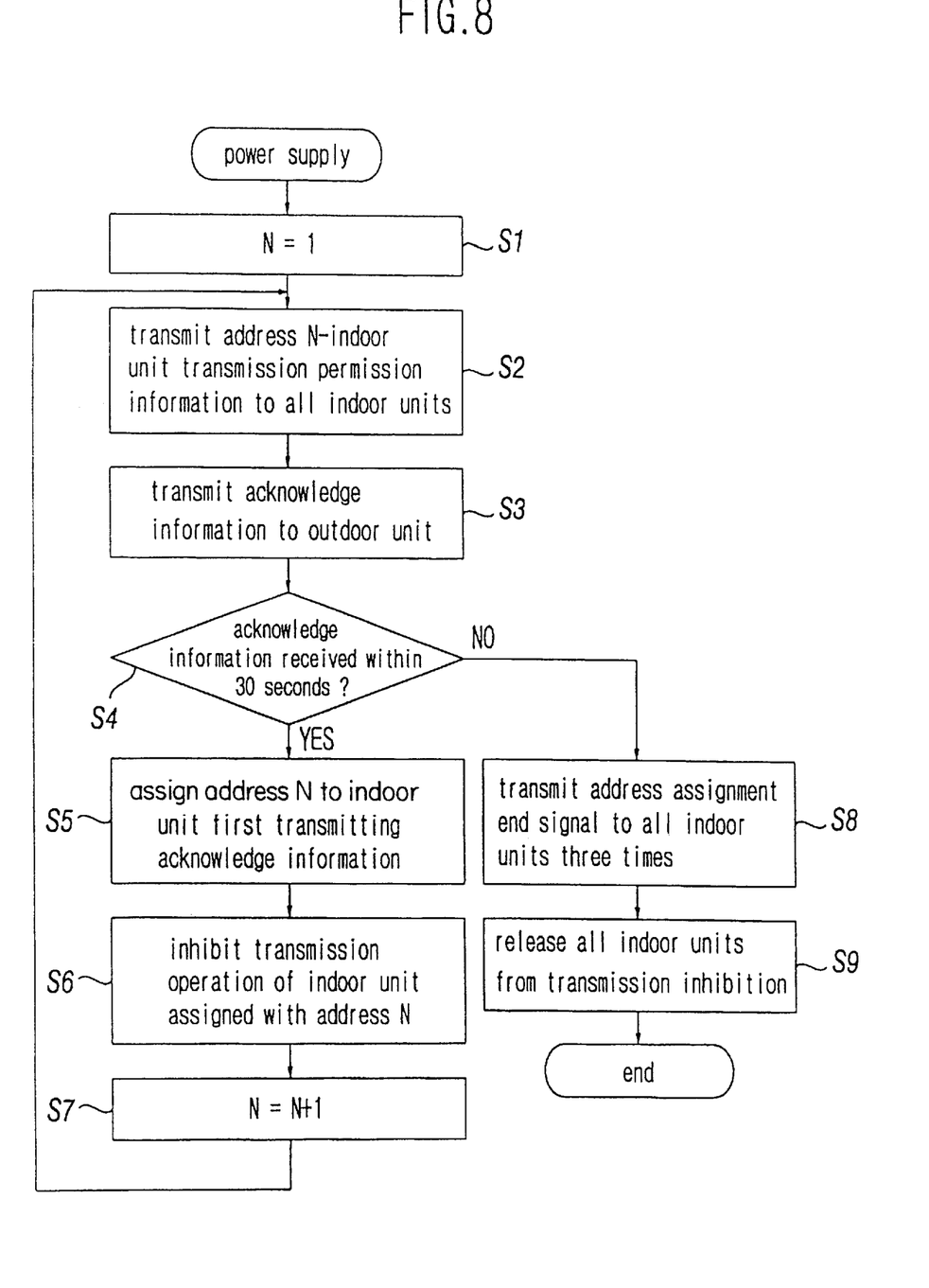
FIG. 8 is a flowchart illustrating a method of automatically assigning addresses to indoor units in the multi-air conditioner system in FIG. 5 in accordance with the present invention.

Now, an initialization method for automatically assigning addresses to the indoor units in the multi-air conditioner system in FIG. 5 in accordance with the present invention will be mentioned in detail with reference to FIG. 8.

With reference to FIG. 8, first, at steps S1 and S2, upon supply of power to the system, the outdoor unit transmits, to all the indoor units, address 1-indoor unit transmission permission information indicative of "permit an indoor unit of an address 1 to perform a transmission operation" and then enters a standby state.

Upon the power supply to the system, each of the indoor units is initialized to an address 0 without its inherent address and then enters the standby state. If each indoor unit receives the address 1-indoor unit transmission permission information from the outdoor unit at the standby state, it transmits acknowledge information to the outdoor unit at step S3.

The outdoor unit continuously checks at step S4 whether the acknowledge information is received within a predetermined time period (for example, 30 seconds). If the acknowledge information is received within the predetermined time period at step S4, the outdoor unit assigns the address 1 to any one of the indoor units which first transmitted the acknowledge information thereto, at step S5.

Then, the outdoor unit inhibits a transmission operation of the indoor unit assigned with the address 1, at step S6, increments the address value by one at step S7 and repeats the above processing. At this time, other indoor units assigned with no address remain at the standby state.

In the case where it is checked at the above step S4 that no acknowledge information is received within the predetermined time period, the outdoor unit recognizes that addresses have been assigned to all the indoor units and transmits an address assignment end signal to all the indoor units a predetermined number of times at step S8. According to the results tested by the applicant, it is the most preferable that the address assignment end signal is transmitted three times.

Thereafter, if all the indoor units receive the address assignment end signal, they are released from the transmission inhibition at step S9. As a result, all the indoor units are ready to communicate for the operation of the multi-air conditioner system.

Figure 9:
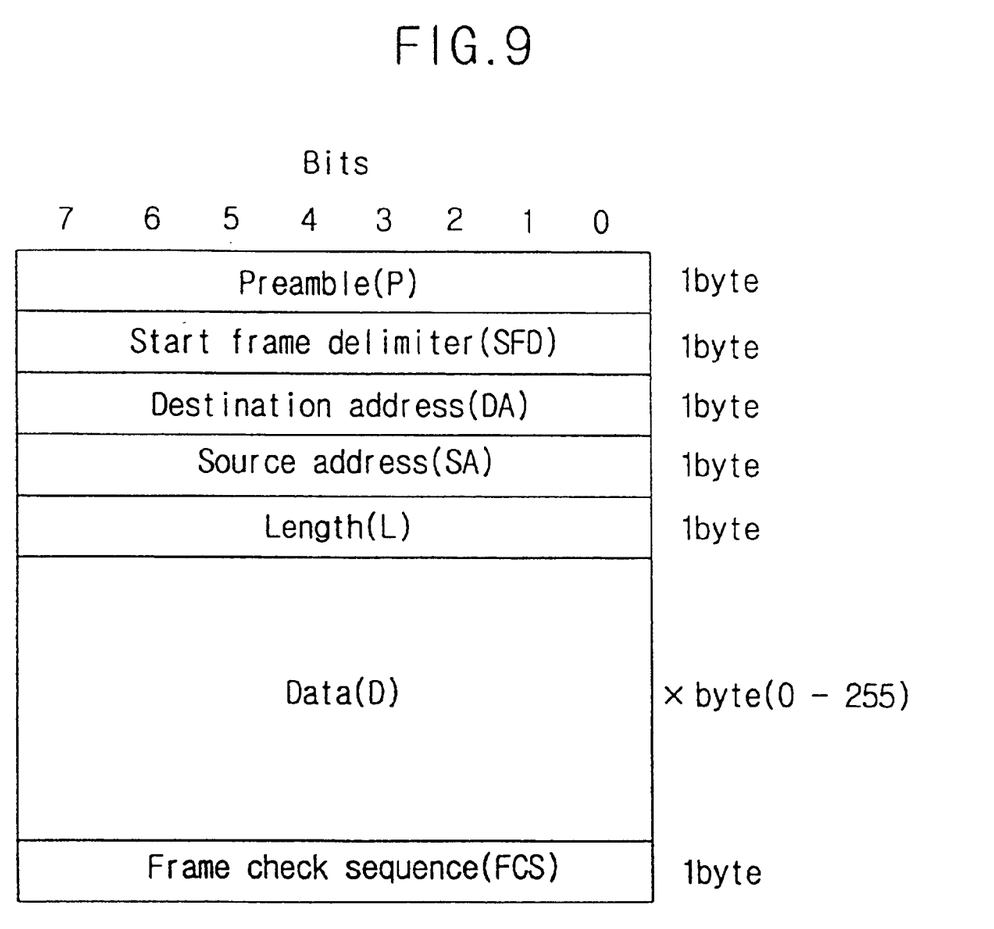
FIG. 9 is a view illustrating a communication frame format used in the present invention.

FIG. 9 shows a communication frame format used in the present invention. In the case of using the communication frame format as shown in FIG. 9, the indoor units are connectable up to 255 in number at the maximum. The reason is that, in the communication frame, a destination address and source address are each composed of one byte, an address 0 is used for the outdoor unit and available addresses other than them are 255 in number. As shown in FIG. 9, the communication frame used in the present invention is composed of a preamble P, start frame delimiter SFD, destination address DA, source address SA, length L, data D and frame check sequence FCS.

On the other hand, at the above step S5, a collision may occur in receiving the acknowledge information from the indoor units and assigning the address N to any one of the indoor units which first transmitted the acknowledge information to the outdoor unit. That is, the acknowledge information may be transmitted by a plurality of indoor units at the same time and then simultaneously received by the outdoor unit.

A typical CSMA/CD method is adopted to avoid such a collision. Namely, upon the occurrence of a collision, the outdoor unit does not perform the addressing operation and again transmits the address N-indoor unit transmission permission information to allow the indoor units to again transmit the acknowledge information. At this time, the collision related indoor units are inhibited from performing their transmission operations, for a predetermined time period to reduce the collision possibility. Each of the indoor units has a variable parameter and collision storage parameter. If a collision occurs, the transmission inhibition period of time is determined depending on a status value of the variable parameter. Further, the collision is recorded in the collision storage parameter so that the number of collisions can be recognized.

As apparent from the above description, according to the present invention, information can be exchanged between the outdoor unit and the indoor units using the non-polarized two-wire power line, thus making the air conditioner installing work less complicated, reducing the material costs and solving the mis-wiring problem.

Further, addresses are automatically assigned to the indoor units upon the power supply to the system. Therefore, there is no need for the system installer to manually assign specific addresses to the indoor units while checking them one by one, so that the addressing operation can rapidly be performed and the installing work can conveniently be made.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A communication module for a multi-air conditioner system, which has a plurality of indoor units and one outdoor unit for controlling the indoor units, comprising:
   a power circuit included in each of said indoor units and outdoor unit, said power circuit being connected to a non-polarized two-wire power line to supply a drive power to a corresponding one of said indoor units and outdoor unit;
   a transmitter/receiver circuit included in each of said indoor units and outdoor unit, said transmitter/receiver circuit being connected to said power line to convert information to be transmitted into a pulse form, which carries the converted results in an alternating current voltage to transmit said information through said power line and receive information from said power line;
   a microcomputer, included in each of said indoor units and outdoor unit, for controlling an associated system operation according to said information from said power line, received by said transmitter/receiver circuit; and
   a blocking filter, connected to a main power input terminal of said system, for preventing said information transmitted and received in said system from being externally transferred.

2. A method of performing an initialization operation of a multi-air conditioner system which has a plurality of indoor units and one outdoor unit for controlling said indoor units, comprising the steps of:
   (a) transmitting address N-indoor unit transmission permission information to said indoor units upon supply of power to said system;
   (b) assigning an address N to a one of said indoor units which first transmits acknowledge information in response to said address N-indoor unit transmission permission information;
   (c) transmitting address N+1-indoor unit transmission permission information to said indoor units after said step (b) is performed;
   (d) assigning an address N+1 to a one of said indoor units which first transmits said acknowledge information in response to said address N+1-indoor unit transmission permission information;
   (e) repeating said steps (c) and (d) to assign addresses to all of said indoor units;
   (f) inhibiting transmission operations of ones of said indoor units assigned with their addresses, until said addresses are assigned to all of said indoor units; and
   (g) transmitting an address assignment end signal to all said indoor units to release them from said transmission inhibition, if said addresses are assigned to all of said indoor units.

* * * * *